UNITED STATES PATENT OFFICE.

SPENCER BAIRD NEWBERRY, OF SANDUSKY, OHIO.

PROCESS OF MAKING STRONTIA.

SPECIFICATION forming part of Letters Patent No. 647,320, dated April 10, 1900.

Application filed August 4, 1899. Serial No. 726,191. (No specimens.)

*To all whom it may concern:*

Be it known that I, SPENCER BAIRD NEWBERRY, of Sandusky, in the county of Erie and State of Ohio, have invented a new and Improved Process of Manufacturing Strontia from Strontium Sulfate, of which the following is a full, clear, and exact description.

My invention relates to the manufacture of strontia from strontium sulfate, and has for its object to provide a method by which the necessary reaction may be produced economically and with much greater ease than according to the processes now practiced.

Strontium sulfate unmixed with other materials can be decomposed by heat; but the process is slow and uncertain, largely owing to the fusibility of the sulfate at high temperatures. I have found that the decomposition is greatly facilitated and the fusion prevented by adding to the sulfate a suitable proportion of a difficulty-fusible basic material, such as magnesia or lime, carbonate of magnesia, or carbonate of lime. The proportions may be about one to two parts of the difficultly-fusible basic material in three parts of the mixture—that is, say one part of basic material and two parts of sulfate or two parts of basic material and one part of sulfate. I desire it to be understood, however, that satisfactory results may be obtained with proportions different from those stated above.

The mixture above described is heated so as to calcine it, the resulting product being a mixture of strontia with magnesia or lime, with perhaps a small proportion of undecomposed strontium sulfate. The reaction which takes place is essentially the decomposition of strontium sulfate by heat according to the equation:

$$SrSo_4 = SrO + SO_3,$$

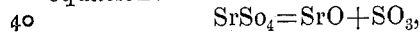

this action being facilitated and rendered complete by the action of the basic material forming part of the mixture.

The calcined product is leached with hot or cold water, by which the strontia is converted into strontium hydrate and dissolved, while the lime or magnesia, being but slightly soluble, remains in condition to be used as a basic material in the next operation.

For the calcination of the mixture of strontium sulfate and basic material I prefer to use a cylindrical rotary kiln similar to the kilns commonly employed in the manufacture of Portland cement. Any of the various types of continuous or intermittent kiln may, however, be used provided the mixed material is molded into bricks and dried before calcining.

It will be understood that from the strontia manufactured according to my process I may produce strontium hydrate, as above referred to, or other strontium compounds, according to the usual methods.

I desire it to be understood that the strontium sulfate employed by me need not be a chemically-pure substance; but as a rule I employ mineral strontium sulfate or celestite. The basic material employed also need not be a pure substance. As a rule I use common lime, limestone, magnesite, or any commercial form of magnesia. These substances, together with any form of carbonate of lime or of magnesia, are therefore equivalents of lime and magnesia.

Having thus described my invention, I claim as new and desire to secure by Letters Patent—

1. The method of manufacturing strontia from strontium sulfate, which consists in mixing strontium sulfate with the oxid of an alkaline earth, and calcining the mixture at a high temperature, substantially as set forth.

2. The method of manufacturing strontia from strontium sulfate, which consists in mixing strontium sulfate with lime, and calcining the mixture at a high temperature.

SPENCER BAIRD NEWBERRY.

Witnesses:
P. B. BEERY,
H. E. FRANCIS.